(12) United States Patent
Vanbuskirk et al.

(10) Patent No.: US 6,505,155 B1
(45) Date of Patent: Jan. 7, 2003

(54) METHOD AND SYSTEM FOR AUTOMATICALLY ADJUSTING PROMPT FEEDBACK BASED ON PREDICTED RECOGNITION ACCURACY

(75) Inventors: Ronald Vanbuskirk, Indiantown, FL (US); Huifang Wang, Boynton Beach, FL (US); Kerry A. Ortega, Raleigh, NC (US); Catherine G. Wolf, Katonah, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/306,355

(22) Filed: May 6, 1999

(51) Int. Cl.$^7$ ............................................... G10L 17/00
(52) U.S. Cl. ..................................... 704/246; 704/250
(58) Field of Search ............................... 704/231, 246, 704/251, 255

(56) References Cited

U.S. PATENT DOCUMENTS

| | | | | |
|---|---|---|---|---|
| 5,027,406 A | * | 6/1991 | Roberts et al. | 704/251 |
| 5,895,447 A | * | 4/1999 | Ittycheriah et al. | 704/231 |
| 5,920,836 A | * | 7/1999 | Gould et al. | 704/251 |
| 5,983,179 A | * | 11/1999 | Gould | 704/251 |
| 5,995,920 A | * | 11/1999 | Carbonell et al. | 704/9 |
| 6,081,780 A | * | 6/2000 | Lumelsky | 704/260 |
| 6,088,669 A | * | 7/2000 | Maes | 704/231 |
| 6,092,043 A | * | 7/2000 | Squires et al. | 704/251 |

OTHER PUBLICATIONS

Koizumi et al, "Speech Recognition Based on a Model of Human Auditory System", Spoken Language, 1996; ICLSP 96 Forth International Conference, vol. 2 1996, pp937–940.*
Smith et al,"Template Adaptation in a Hypersphere Word Classifier", ICASSP 1990, pp 565–569, vol. 1.*
Yankelovich et al, "Designing SpeechActs: Issues in Speech User Interfaces," CHI '95 Mosiac of Creativity, May 7–11, 1995, pp. 369–376.

* cited by examiner

Primary Examiner—Richemond Dorvil
Assistant Examiner—Michael N. Opsasnick
(74) Attorney, Agent, or Firm—Akerman Senterfitt (57) ABSTRACT

In a computer speech user interface, a method and computer apparatus for automatically adjusting the content of feedback in a responsive prompt based upon predicted recognition accuracy by a speech recognizer. The method includes the steps of receiving a user voice command from the speech recognizer; calculating present speech recognition accuracy based upon the received user voice command; predicting future recognition accuracy based upon the calculated present speech recognition accuracy; and, generating feedback in a responsive prompt responsive to the predicted recognition accuracy. For predicting future poor recognition accuracy based upon poor present recognition accuracy, the calculating step can include monitoring the received user voice command; detecting a reduced accuracy condition in the monitored user voice command; and, determining poor present recognition accuracy if the reduced accuracy condition is detected in the detecting step.

24 Claims, 5 Drawing Sheets

METHOD AND SYSTEM FOR AUTOMATICALLY ADJUSTING PROMPT FEEDBACK BASED ON PREDICTED RECOGNITION ACCURACY

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Technical Field

This invention relates to the field of computer speech recognition and more particularly to a method and computer apparatus in which a speech user interface can automatically adjust the content of prompt feedback based on predicted recognition accuracy.

2. Description of the Related Art

Speech recognition is the process by which an acoustic signal received by microphone is converted to a set of words by a computer. These recognized words may then be used in a variety of computer software applications for purposes such as document preparation, data entry and command and control in a speech user interface. Implementing a usable speech user interface, however, involves overcoming substantial obstacles.

Ironically, the bane of the speech user interfaces can be the very tool which makes them possible: the speech recognizer. Often, it is difficult to verify whether the speech recognizer has understood a speech command correctly. In fact, interacting with a speech recognizer has been compared to conversing with a beginning student of a foreign language: In that instance, because misunderstandings can occur more frequently, each participant in the conversation must continually check and verify, often repeating or rephrasing until understood.

Likewise, error-prone speech recognizers require that the speech recognition system emphasize feedback and verification. Yet, error identification and error repair can be time consuming and tiring. Notably, participants in a recent field study for evaluating speech user interface design issues complained about the slow pace of interaction with the speech user interface, particularly with regard to excessive feedback. Still, in a speech user interface, there is a strong connection between required feedback and recognition accuracy. When the recognition accuracy is high, short prompts incorporating little feedback are appropriate because it is unlikely that the speech recognizer will misunderstand the speech command. In contrast, where recognition accuracy is reduced, longer prompts incorporating significant feedback become necessary.

Speech recognition errors can be divided into three categories: rejection, substitution, and insertion. A rejection error occurs where the speech recognizer fails to interpret a speech command. A substitution error occurs where the speech recognizer mistakenly interprets a speech command for a different, albeit legitimate, speech command. For instance, a substitution error is said to occur where the speech command "send a message" is misinterpreted as "seventh message." Finally, an insertion error can occur when the speech recognizer interprets unintentional input, such as background noise, as a legitimate speech command.

In handling rejection errors, human factors experts seek to avoid the "brick wall" effect which can occur where a speech recognizer responds to every rejection error with the same error message, for instance, the notorious "Abort, Retry, Fail" message of DOS. In response, human factors experts propose incorporating progressive assistance where a short error message is supplied in response to the first few rejections. Successive rejections are followed by progressively more thorough prompts containing helpful feedback. Progressive assistance, however, operates in response to misrecognitions. Progressive assistance does not anticipate and respond to predicted future misrecognitions.

Though rejection errors merely can be frustrating, substitution errors can have more significant consequences. As one human factors expert notes, if a user submits a voice command to a weather application requesting the weather in "Kuai", but the speech recognizer interprets the speech command as "Good-bye" and disconnects, the interaction will have been completely terminated. Hence, in some situations, an explicit verification of a speech command would seem appropriate. Explicit feedback in the form of verifying every speech command, however, would prove tedious. In particular, where speech commands comprise short queries, verification can take longer than presentation. Consequently, current speech recognition theory acknowledges the utility of implicit feedback—including part of the recognized speech command in the responsive prompt. Nevertheless, present explicit and implicit feedback verification schemes respond only to occurring errors. In fact, one system only provides implicit feedback for commands involving the presentation of data, and explicit feedback for commands which will destroy data or set into motion future events. Presently, no systems provide feedback according to predicted substitution errors.

Finally, spurious insertion errors can occur primarily in consequence of background noise. Present speech recognizers normally will reject the illusory speech command. On occasion, however, speech recognizers can mistake the illusory speech command for an actual speech command. Typical solutions to spurious insertion errors focus upon preventing the error at the outset. Such methods involve suspending speech recognition in the presence of heightened background noise. Still, existing systems fail to anticipate recognition errors in consequence of heightened background noise. These systems will not recognize an increase in background noise and proactively adjust feedback.

SUMMARY OF THE INVENTION

The invention concerns a method and computer apparatus for automatically adjusting the content of feedback in a responsive prompt based upon predicted recognition accuracy by a speech recognizer. The method involves receiving a user voice command from the speech recognizer; calculating a present speech recognition accuracy based upon the received user voice command; predicting a future recognition accuracy based upon the calculated present speech recognition accuracy; and, controlling feedback content of the responsive prompt in accordance with the predicted recognition accuracy. For predicting future poor recognition accuracy based upon poor present recognition accuracy, the calculating step can include monitoring the received user voice command; detecting a reduced accuracy condition in the monitored user voice command; and, determining poor present recognition accuracy if the reduced accuracy condition is detected in the detecting step. Detecting a reduced accuracy condition, however, does not always correspond to detecting a poor accuracy condition. Rather, a reduced accuracy condition can be a condition in which recognition accuracy is determined to fall below perfect recognition accuracy.

For detecting a reduced accuracy condition, the detecting step can include obtaining a confidence value associated with the received user voice command from the speech recognizer; identifying as a reduced confidence value each confidence value having a value below a preset threshold; and, triggering a reduced accuracy condition if the reduced confidence value is identified in the identifying step. Another detecting step can include storing the user voice command in a command history; calculating a sum of user undo voice commands stored in the command history; and, triggering a reduced accuracy condition if the sum exceeds a preset threshold value. One skilled in the art will recognize, however, that the undo voice command can include any number of synonymous user commands interpreted by the system to indicate a user command to return to the previous command state. Similarly, the detecting step can comprise storing the user voice command in a command history; calculating a sum of user cancel voice commands stored in the command history; and, triggering a reduced accuracy condition if the sum exceeds a preset threshold value. As in the case of the undo command, one skilled in the art will recognize that the cancel command can include any number of synonymous user commands interpreted by the system to indicate a user command to disregard the current command.

Yet another detecting step can include comparing the user voice command to a corresponding computer responsive prompt; determining whether the voice command is inconsistent with the corresponding computer responsive prompt; identifying the user voice command determined to be inconsistent with the corresponding computer responsive prompt as an unexpected user voice command; storing the unexpected user voice command in a command history; calculating a sum of unexpected user voice commands stored in the command history; and, triggering a reduced accuracy condition if the sum exceeds a preset threshold value. Finally, the detecting step can comprise obtaining measured acoustical signal quality data from the speech recognizer; and, triggering a reduced accuracy condition if the measured acoustical signal quality evaluates below a preset threshold value.

In the presence of a reduced accuracy condition, the generating step can comprise providing the received user voice command as a computer responsive prompt. Another generating step can comprise incorporating the received user voice command as part of a subsequent computer responsive prompt. Yet another generating step can include providing a request for confirmation of the received voice command as a computer responsive prompt. The generating step also can comprise: concatenating the received user voice command with a subsequent computer responsive prompt; and, providing the concatenation as a single computer responsive prompt. Finally, the generating step can comprise providing a list of high-recognition user voice commands as a computer responsive prompt.

It will be appreciated, however, that the present invention can also predict future adequate recognition accuracy based upon high accuracy conditions detected in the monitored user voice command. Thus, one skilled in the art will recognize that the calculating step could include: monitoring the received user voice command; detecting a high accuracy condition in the monitored user voice command; and determining good present recognition accuracy if the high accuracy condition is detected in the detecting step. Responsive to predicted adequate recognition accuracy, the present invention could reduce prompt feedback in the computer responsive prompt. In particular, longer prompts would prove unnecessary in a high accuracy recognition environment.

BRIEF DESCRIPTION OF THE DRAWINGS

There are presently shown in the drawings embodiments which are presently preferred, it being understood, however, that the invention is not limited to the precise arrangements and instrumentalities shown.

DETAILED DESCRIPTION OF THE INVENTION

Figure 1:
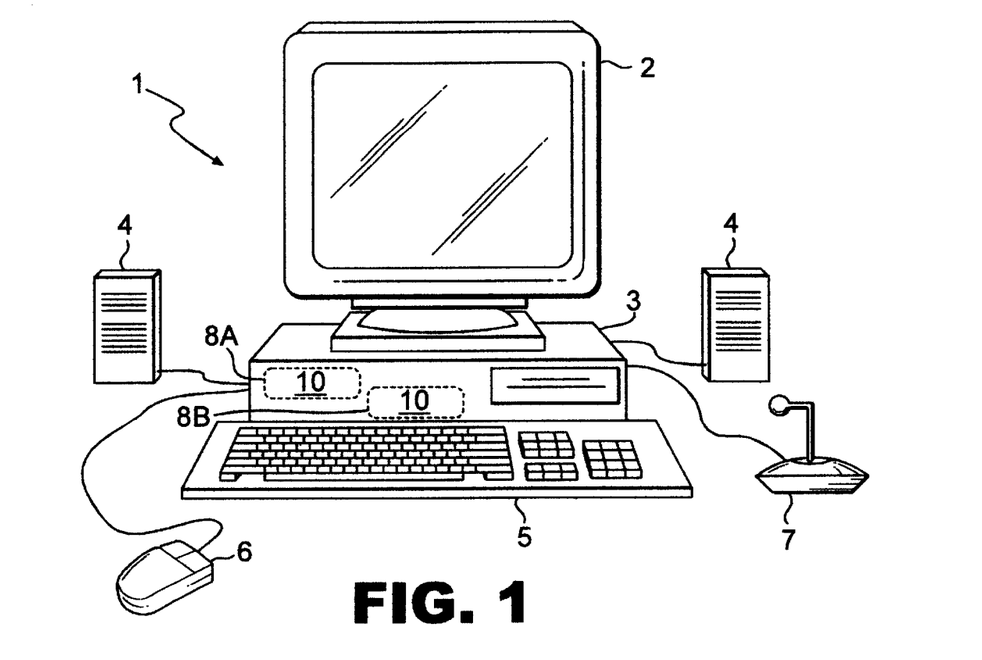
FIG. 1 is a pictorial representation of a computer system for speech recognition on which the system of the invention can be used.

FIG. 1 shows a typical computer system 1 for use in conjunction with the present invention. The system preferably is comprised of a computer 3 including a central processing unit (CPU), one or more memory devices and associated circuitry. The system also includes a microphone 7 operatively connected to the computer system through suitable interface circuitry or "sound board" (not shown), a keyboard 5, and at least one user interface display unit 2 such as a video data terminal (VDT) operatively connected thereto. The CPU can be comprised of any suitable microprocessor or other electronic processing unit, as is well known to those skilled in the art. An example of such a CPU would include the Pentium or Pentium II brand microprocessor available from Intel Corporation, or any similar microprocessor. Speakers 4, as well as an interface device, such as mouse 6, can also be provided with the system, but are not necessary for operation of the invention as described herein. The various hardware requirements for the computer system as described herein can generally be satisfied by any one of many commercially available high speed multimedia personal computers offered by manufacturers such as International Business Machines (IBM), Compaq, Hewlett Packard, or Apple Computers.

Figure 2:
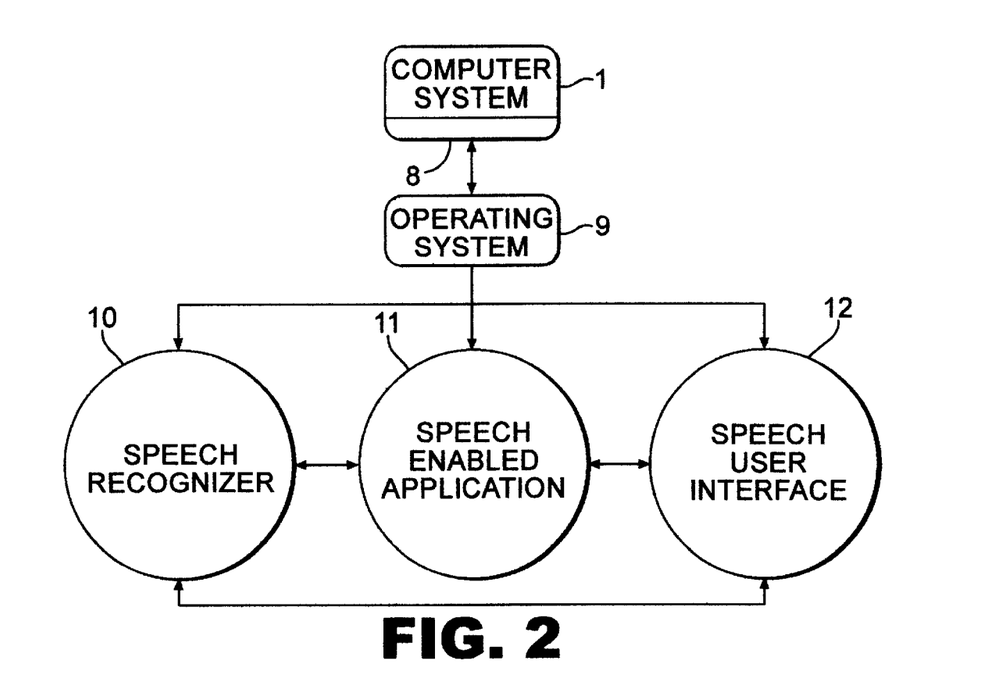
FIG. 2 is a block diagram showing a typical high level architecture for the computer system in FIG. 1.

FIG. 2 illustrates a preferred architecture for a speech recognition system in computer 1. As shown in FIG. 2, the system can include an operating system 9, a speech recognizer 10 in accordance with the inventive arrangements, and a speech user interface 12. A speech enabled application 11 can also be provided. In FIG. 2, the speech recognizer 10, the speech enabled application 11, and the speech user interface 12 are shown as separate application programs. It should be noted, however, that the invention is not limited in this regard, and these various applications could, of course, be implemented as a single, more complex applications program.

In a preferred embodiment which shall be discussed herein, operating system 9 is one of the Windows® family of operating systems, such as Windows NT®, Windows 95® or Windows 98® which are available from Microsoft Corporation of Redmond, Wash. However, the system is not limited in this regard, and the invention can also be used with any other type of computer operating system, for example, IBM AIX®, Sun Solaris®, or Linux. The system as disclosed herein can be implemented by a programmer, using commercially available development tools for the operating systems described above. As shown in FIG. 2, computer system 1 includes one or more computer memory devices 8, preferably an electronic random access memory 8A and a bulk data storage medium, such as a magnetic disk drive 8B.

Audio signals representative of sound received in microphone 7 are processed within computer 1 using conventional computer audio circuitry so as to be made available to operating system 9 in digitized form. The audio signals received by the computer 1 are conventionally provided to the speech recognizer 10 via the computer operating system 9 in order to perform speech recognition functions. As in conventional speech recognition systems, the audio signals are processed by the speech recognizer 10 to identify words spoken by a user into microphone 7. One skilled in the art will note, however, that the inventive arrangements are not limited to receiving audio signals through a microphone. Rather, according to the inventive arrangements, the speech recognizer 10 can identify words spoken by a user into an alternative input device, for example, a telephone.

Figure 3:
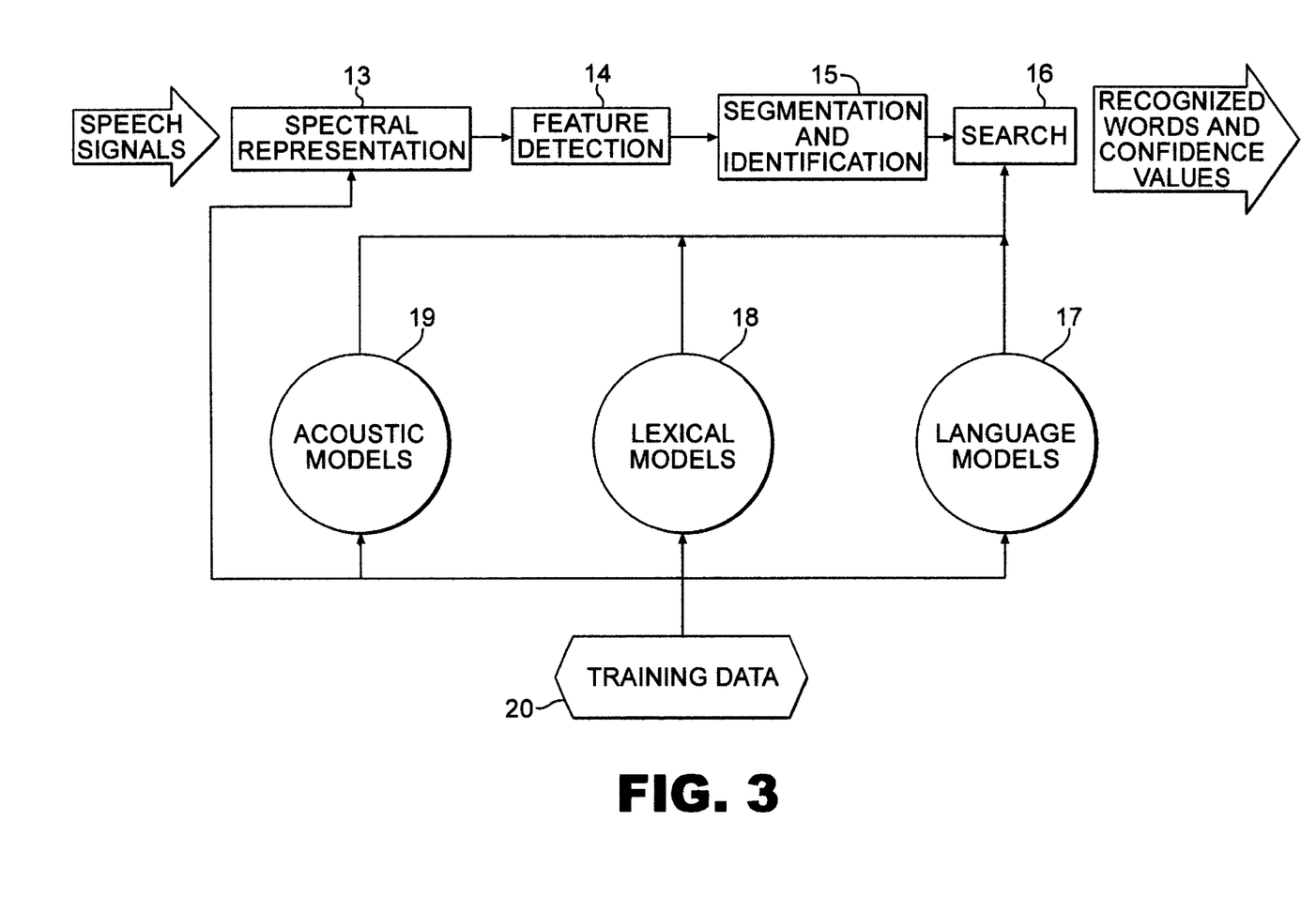
FIG. 3 is a block diagram showing a typical architecture for a speech recognizer.

FIG. 3 is a block diagram showing typical components which comprise speech recognizer 10. As shown in FIG. 3, the speech recognizer 10 receives a digitized, time-varying speech signal from the operating system 9. In spectral representation block 13, a speech analysis system provides a spectral representation of the characteristics of the time-varying speech signal by sampling the signal at some fixed rate, typically every 10–20 msec. In block 14, the feature-detection stage converts the spectral measurements to a set of features that describe the broad acoustic properties of each, differing phonetic unit. This stage emphasizes perceptually important speaker-independent features of the speech signals received from the operating system 9. In block 15, these speech signal features are segmented and identified as phonetic sequences. In this stage, algorithms process the speech signals to further adapt speaker-independent acoustic models to those of the current speaker. Finally, in search block 16, the speech recognizer 10 accepts these phonetic sequences and applies search algorithms to guide its search engine to the most likely words corresponding to the speech signal. To assist in the search process, the process in search block 16 can enlist the assistance of acoustic models 19, lexical models 18 and language models 17. Subsequently, the speech recognizer 10 returns word matches and confidence values for each match which can be used to determine recognition accuracy.

There is a strong connection between required feedback and recognition accuracy for a speech user interface. When the recognition accuracy is high, it is easy and efficient to provide short responsive computer prompts to user voice commands. In contrast, notwithstanding the difficulty and inefficiency of providing longer prompts, poor recognition accuracy necessitates the provision of longer, more substantive responsive computer prompts to user voice commands. This problem is solved in accordance with the inventive arrangements by providing a system and method for automatically adjusting prompt feedback in a responsive prompt based upon predicted recognition accuracy by a speech recognizer.

The parts of FIG. 4 are a flow chart illustrating the various steps according to the method of the invention. The method is preferably implemented as part of the speech recognizer 10 as shall now be described. As shown in FIG. 4A, the process begins in step 21 by invoking the speech user interface. Once invoked, the speech user interface 12 can process voice commands, or commands delivered entirely by speech. Alternatively, the speech user interface 12 can process partial voice commands, or commands including both a voice component and a text component. Finally, the speech user interface 12 can process entirely non-speech commands, for example when a user repeatedly issues an "undo" command by mouse-clicking on an undo button in a graphical user interface. Depending upon the particular speech enabled application, the speech user interface 12 can provide prompts to the user, responsive to the user's voice command.

As previously noted, the speech recognizer 10, the speech user interface 12, and the speech enabled application 11 can be implemented in the form of distinct applications programs or can be integrated to form a single, integrated application. If the two applications are fully integrated, then voice commands interpreted by the speech recognizer 10 will be immediately available to the speech user interface 12. Likewise, voice commands processed by the speech user interface 12 will be immediately available to the speech enabled application 11. It will be readily appreciated by those skilled in the art that in those instances where the speech recognizer 10, speech enabled application, and speech user interface 12 are designed independently of each other, then suitable application hooks must be provided to permit communication between each application. This can be accomplished using various concurrent process programming methods which are known to programmers skilled in the art.

Figure 4A:
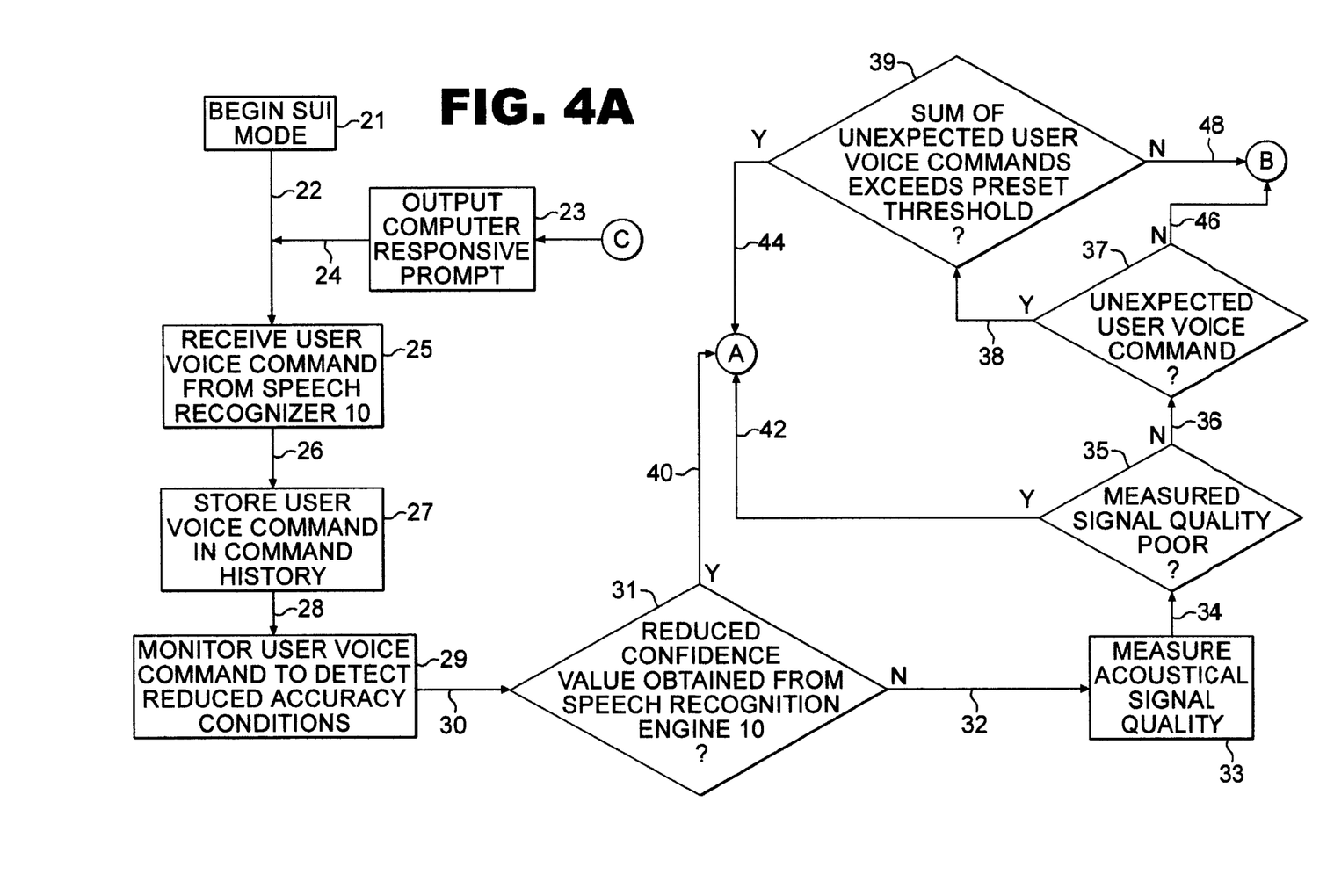
FIGS. 4A–4G taken together, are a flow chart illustrating a process for automatically adjusting prompt feedback based upon predicted recognition accuracy by a speech recognizer.

In FIG. 4A, once the speech user interface 12 has been invoked in step 21, the speech user interface can receive a user voice command from speech recognizer 10 in step 25. Significantly, each time a user utters a voice command, the speech user interface preferably stores the voice command in a command history as shown in step 27. According to the preferred embodiment of the invention, the system will monitor the recognition accuracy of each user voice command for the purpose of predicting future recognition accuracy. As will hereinafter be explained in further detail, the system will increase prompt feedback in each computer responsive prompt upon predicting future poor recognition accuracy. One method of predicting future poor recognition accuracy is detecting reduced accuracy conditions resulting from current speech recognition.

Reduced accuracy conditions are noticeable under a variety of circumstances. For instance, where the speech recognizer returns a reduced confidence value from a previous speech recognition operation, a reduced accuracy condition exists. Thus, in step 29, the preferred embodiment monitors each contemporary user voice command to detect a reduced accuracy condition. If a reduced confidence value is received from the speech recognition engine 10 in decision block 31, the system, following path 40, will conclude that a reduced accuracy condition exists. The system also can detect a reduced accuracy condition by measuring the signal quality received by the audio circuitry of the computer 1 and processed by the speech recognizer 10. The measuring step is shown in block 33. If the measured signal quality is poor, for instance if the signal is deemed to be a noisy, low gain signal in step 35, then following along path 42, the system will conclude that a reduced accuracy condition exists.

Though a reduced confidence value may not be received from the speech recognizer in step 31, and though the system may not encounter poor signal quality in step 35, following path 36, a reduced accuracy condition still may exist by virtue of repetitive unexpected voice commands in response to a computer responsive prompt. An unexpected voice command occurs when the user provides a voice command inconsistent with the previous computer responsive prompt. Normally, this condition indicates that the user is unable to validly respond to the responsive prompt. This can occur when the user's voice commands are misrecognized by the speech recognizer 10. Consequently, the computer prompts the user for a voice command inconsistent with the user's actual voice command, but consistent with the computer's misrecognition of the user's voice command. The user, unwilling to submit to the computer's responsive prompt, persists in responding using a voice command valid only in the context of the user's actual, original voice command.

Recognizing this phenomenon, in decision block 37, the system first identifies whether the user voice command is inconsistent with the computer responsive prompt. If so, having identified an unexpected voice response, following path 38 to decision block 39, the speech user interface 12 calculates the number of unexpected voice responses, each unexpected voice response having been stored in the command history in step 27. If the sum of the unexpected voice responses exceeds a preset threshold value, the speech user interface, following path 44, will conclude that a reduced accuracy condition exists.

Figure 4B:
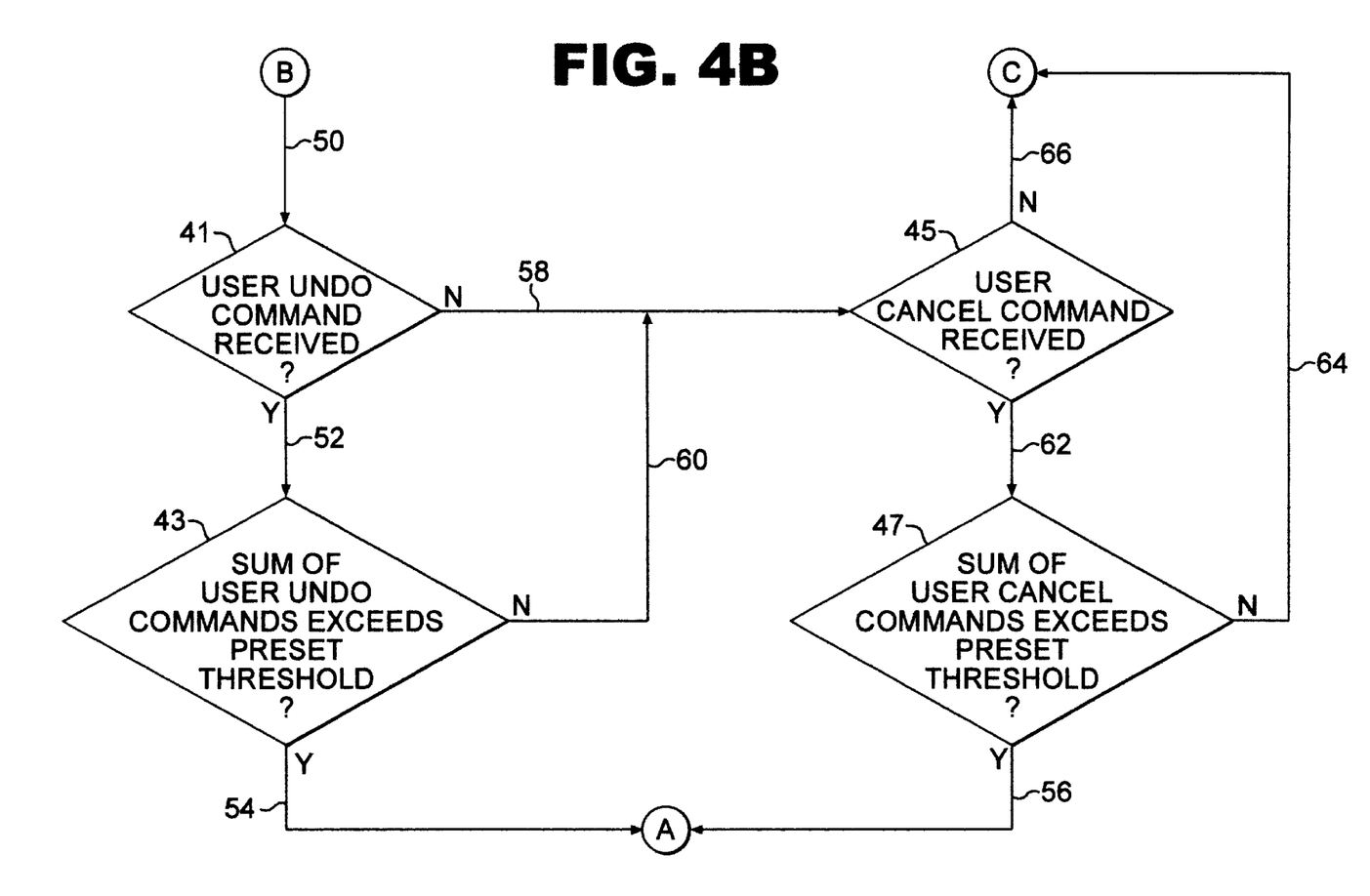

In the preferred embodiment, two additional methods exist for identifying a reduced accuracy condition. As shown in FIG. 4B, the repeated invocation of an "undo" command by the user often will indicate a reduced accuracy condition. For instance, when the user frequently, in sequence, issues the voice command, "Go Back", it is likely that the user's intended voice command has been misrecognized by the speech recognizer 10. Hence, in decision block 41, the speech user interface 12 first identifies whether the user has uttered an "undo" voice command. If so, following path 52 to decision block 43, the system examines the command history, summing the number of issuances of the "undo" voice command. In the present embodiment, the sum can include an unweighted sum, or a weighted sum which can impose increasingly greater weight to more recent user "undo" commands, while attaching lesser weight to older "undo" commands. If the sum exceeds a preset threshold, following path 54, the speech user interface 12 will conclude that a reduced accuracy condition exists.

Likewise, the serial issuance of the "cancel" command often warns of a speech recognizer 10 misrecognition. Like the user's repetitive utterance of the "undo" command, the sequential invocation of the "cancel" command demonstrates that the speech recognizer 10 has substituted an unwanted command for the user's intended voice command. Recognition of this condition is evident in decision blocks 45 and 47 of FIG. 4B. In decision block 45, the speech user interface 12 first identifies a repetitive user "cancel" command. Having done so, following path 62 to block 47, the system sums the number of serial occurrences of the "cancel" command, stored in the command history in step 27. The sum can include an unweighted sum, or a weighted sum which can impose increasingly greater weight to more recent user "cancel" commands, while attaching lesser weight to older "cancel" commands. If the sum exceeds a preset threshold level, the speech user interface will trigger a reduced accuracy condition along path 56.

Figure 4C:
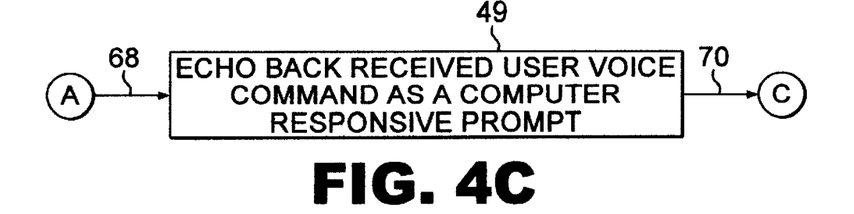
Figure 4D:
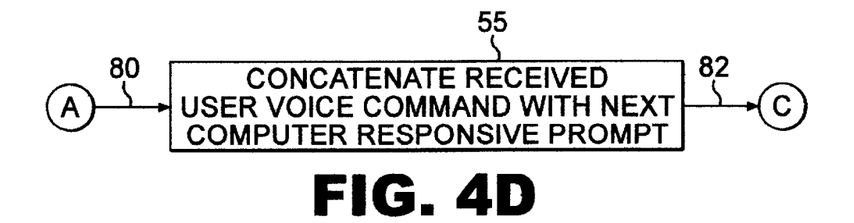

Once a reduced accuracy condition has been detected in either of decision blocks 31, 35, 39, 43 or 47, prompt feedback to the user can be increased through one or more of the following methods. FIG. 4C illustrates the use of explicit feedback as a help mechanism. Specifically, in step 49, the speech user interface 12 will echo back the received user voice command as the computer responsive prompt. Following along path 70 to step 23 in FIG. 4A, the system subsequently will output, visually, acoustically, or both, the computer responsive prompt. Similarly, as shown in FIG. 4D in step 55, the speech user interface 12 can concatenate in a single computer responsive prompt the explicit feedback as in step 49, with a subsequent prompt. Following along path 82 to step 23 in FIG. 4A, again, the system subsequently will output, visually, acoustically, or both, the computer responsive prompt.

Figure 4E:
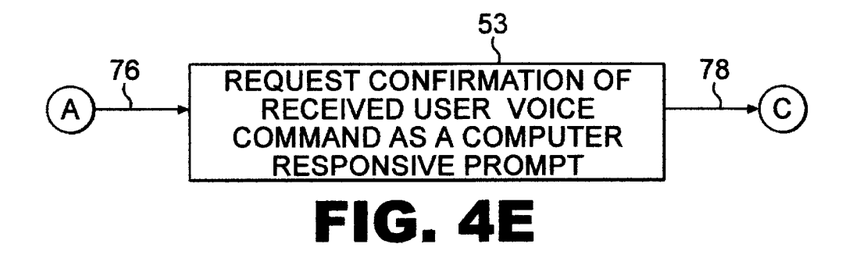

FIG. 4E illustrates increased feedback in the form of a confirmation. Specifically, in response to a user voice command posed in a reduced accuracy condition, the system simply can ask the user to confirm the voice command recognized by the speech recognizer 10. In step 53 of FIG. 4E, the speech user interface 12 will incorporate the request for confirmation as the computer responsive prompt. Following path 78 to step 23 of FIG. 4A, the system subsequently will output, visually, acoustically, or both, the computer responsive prompt.

Figure 4F:
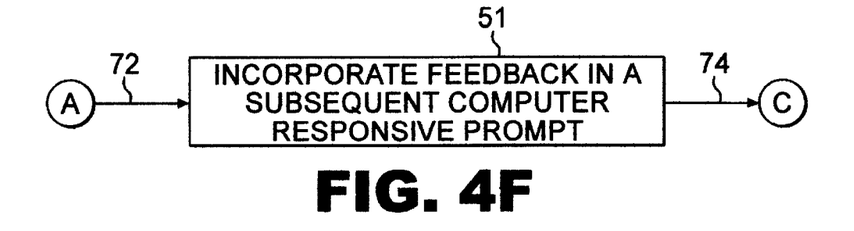

FIG. 4F demonstrates the preferred embodiment's ability to provide implicit feedback in response to a user voice command posed in a reduced accuracy condition. Implicit feedback occurs where the content and substance of the responsive prompt implicitly reflects the user's previous voice command. By way of example, a speech enabled travel program might output a first responsive prompt, "Do you want to take the plane or the bus?" The user voice command, "Plane", could implicitly be incorporated into a second computer responsive prompt, "Do you want an aisle seat on the plane?" This approach is evident in step 51 of FIG. 4F. In step 51, the speech user interface 12 will embed in the responsive prompt feedback a word or phrase reflecting the speech recognizer's 10 understanding of the user voice command. Following path 74 to step 23 of FIG. 4A, the system subsequently will output, visually, acoustically, or both, the computer responsive prompt.

Figure 4G:
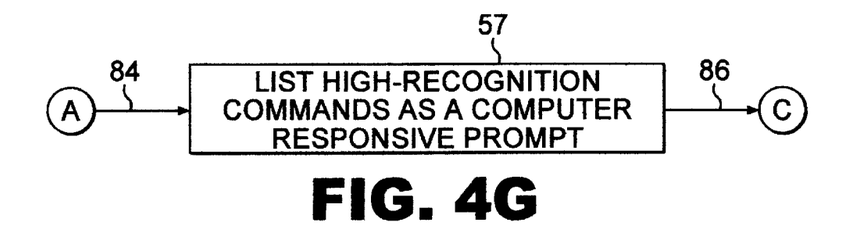

FIG. 4G explains the preferred embodiment's final method for increasing feedback in response to predicted future poor recognition accuracy. In FIG. 4G, step 57 demonstrates the incorporation of a listing of high-recognition commands into the computer responsive prompt. In natural language understanding systems, shorter commands, by definition, result in higher recognition accuracy. Hence, by predicting future recognition problems, the speech user interface 12 can utilized increased bandwidth and can provide examples of high-recognition commands to the user in the form of a computer responsive prompt. Following path 86 to step 23 of FIG. 4A, the system subsequently will output, visually, acoustically, or both, the computer responsive prompt incorporating the list of high-recognition commands.

Increased prompt feedback notwithstanding, in all instances where a reduced accuracy condition is not detected, the speech user interface 12 can provide a computer responsive prompt to the user voice command. Moreover, it will be noted by those skilled in the art that the foregoing system, conversely, can detect the absence of a reduced accuracy condition. As such, in an alternative embodiment to the present invention, the speech user interface can reduce prompt feedback in the computer responsive prompts under the circumstance where a "high accuracy condition" prevails.

While the foregoing specification illustrates and describes the preferred embodiments of this invention, it is to be understood that the invention is not limited to the precise construction herein disclosed. The invention can be embodied in other specific forms without departing from the spirit or essential attributes. Accordingly, reference should be made to the following claims, rather than to the foregoing specification, as indicating the scope of the invention.

What is claimed is:

1. In a computer speech user interface, a method for automatically adjusting the content of feedback in a responsive prompt based upon predicted recognition accuracy by a speech recognizer, comprising the steps of:

receiving a user voice command from said speech recognizer;

calculating a present speech recognition accuracy based upon said received user voice command;

predicting a future recognition accuracy based upon said calculated present speech recognition accuracy; and, controlling semantic content of said responsive prompt to be provided to said user in accordance with said predicted recognition accuracy.

2. The method according to claim 1, wherein said calculating step comprises:

monitoring said received user voice command;

detecting a reduced accuracy condition in said monitored user voice command; and, determining poor present recognition accuracy if said reduced accuracy condition is detected in said detecting step.

3. The method according to claim 2, wherein said detecting step comprises:

obtaining a confidence value associated with said received user voice command from said speech recognizer;

identifying as a reduced confidence value each said obtained confidence value having a value below a preset threshold; and, triggering a reduced accuracy condition if said obtained reduced confidence value is identified in said identifying step.

4. The method according to claim 2, wherein said detecting step comprises:

storing said user voice command in a command history;

calculating a sum of user undo voice commands stored in said command history; and, triggering a reduced accuracy condition if said sum exceeds a preset threshold value.

5. The method according to claim 2, wherein said detecting step comprises:

storing said user voice command in a command history;

calculating a sum of user cancel voice commands stored in said command history; and, triggering a reduced accuracy condition if said sum exceeds a preset threshold value.

6. The method according to claim 2, wherein said detecting step comprises:

comparing said user voice command to a corresponding computer responsive prompt;

determining whether said voice command is inconsistent with said corresponding computer responsive prompt;

identifying said user voice command determined to be inconsistent with said corresponding computer responsive prompt as an unexpected user voice command;

storing said unexpected user voice command in a command history;

calculating a sum of unexpected user voice commands stored in said command history; and, triggering a reduced accuracy condition if said sum exceeds a preset threshold value.

7. The method according to claim 2, wherein the detecting step comprises:

obtaining measured acoustical signal quality data from said speech recognizer; and, triggering a reduced accuracy condition if said measured acoustical signal quality evaluates below a preset threshold value.

8. The method according to claim 2, wherein said controlling step comprises providing said received user voice command as a computer responsive prompt.

9. The method according to claim 2, wherein said controlling step comprises incorporating said received user voice command as part of a subsequent computer responsive prompt.

10. The method according to claim 2, wherein said controlling step comprises providing a request for confirmation of said received voice command as a computer responsive prompt.

11. The method according to claim 2, wherein said controlling step, comprises:

concatenating said received user voice command with a subsequent computer responsive prompt; and, providing said concatenation as a single computer responsive prompt.

12. The method according to claim 2, wherein said controlling step comprises providing a list of high-recognition user voice commands as a computer responsive prompt.

13. A computer apparatus programmed with a routine set of instructions stored in a fixed medium, said computer apparatus comprising:

means for receiving a user voice command from a speech recognizer in a speech interface;

means for calculating a present speech recognition accuracy based upon said received user voice command;

means for predicting a future recognition accuracy based upon said calculated present speech recognition accuracy; and, means for controlling semantic content of a responsive prompt to be provided to said user in accordance with said predicted recognition accuracy.

14. The computer apparatus according to claim 13, wherein said calculating means comprises:

means for monitoring said received user voice command;

means for detecting a reduced accuracy condition in said monitored user voice command; and, means for determining poor present recognition accuracy if said reduced accuracy condition is detected by said detecting means.

15. The computer apparatus according to claim 14, wherein said detecting means comprises:

means for obtaining a confidence value associated with said received user voice command from said speech recognizer;

means for identifying as a reduced confidence value each said obtained confidence value having a value below a preset threshold; and, means for triggering a reduced accuracy condition if said obtained reduced confidence value is identified by said identifying means.

16. The computer apparatus according to claim 14, wherein said detecting means comprises:
- means for storing said user voice command in a command history;
- means for calculating a sum of user undo voice commands stored in said command history; and,
- means for triggering a reduced accuracy condition if said calculated sum exceeds a preset threshold value.

17. The computer apparatus according to claim 14, wherein said detecting means comprises:
- means for storing said user voice command in a command history;
- means for calculating a sum of user cancel voice commands stored in said command history; and,
- means for triggering a reduced accuracy condition if said calculated sum exceeds a preset threshold value.

18. The computer apparatus according to claim 14, wherein said detecting means comprises:
- means for comparing said user voice command to a corresponding computer responsive prompt;
- means for determining whether said voice command is inconsistent with said corresponding computer responsive prompt;
- means for identifying said user voice command determined by said determining means to be inconsistent with said corresponding computer responsive prompt as an unexpected user voice command;
- means for storing said identified unexpected user voice command in a command history;
- means for calculating a sum of unexpected user voice commands stored in said command history; and,
- means for triggering a reduced accuracy condition if said calculated sum exceeds a preset threshold value.

19. The computer apparatus according to claim 14, wherein said detecting step means comprises:
- means for obtaining measured acoustical signal quality data from said speech recognizer; and,
- means for triggering a reduced accuracy condition if said obtained measured acoustical signal quality evaluates below a preset threshold value.

20. The computer apparatus according to claim 14, wherein said controlling means comprises means for providing said received user voice command as a computer responsive prompt.

21. The computer apparatus according to claim 14, wherein said controlling means comprises means for incorporating said received user voice command as part of a subsequent computer responsive prompt.

22. The computer apparatus according to claim 14, wherein said controlling means comprises means for providing a request for confirmation of said received voice command as a computer responsive prompt.

23. The computer apparatus according to claim 14, wherein said controlling means comprises:
- means for concatenating said received user voice command with a subsequent computer responsive prompt; and,
- means for providing said concatenation as a single computer responsive prompt.

24. The method according to claim 14, wherein said controlling means comprises providing a list of high-recognition user voice commands as a computer responsive prompt.

* * * * *